(12) United States Patent
Wu

(10) Patent No.: US 9,133,793 B2
(45) Date of Patent: Sep. 15, 2015

(54) BOOSTING DEVICES WITH INTEGRAL FEATURES FOR RECIRCULATING EXHAUST GAS

(75) Inventor: Ko-Jen Wu, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 627 days.

(21) Appl. No.: 12/975,959

(22) Filed: Dec. 22, 2010

(65) Prior Publication Data
US 2012/0159949 A1    Jun. 28, 2012

(51) Int. Cl.
| | |
|---|---|
| F02B 33/44 | (2006.01) |
| F02M 25/07 | (2006.01) |
| F02C 6/12 | (2006.01) |
| F02B 29/04 | (2006.01) |
| F02B 37/00 | (2006.01) |

(52) U.S. Cl.
CPC .............. *F02M 25/0712* (2013.01); *F02C 6/12* (2013.01); *F02M 25/071* (2013.01); *F02M 25/0709* (2013.01); *F02M 25/0731* (2013.01); *F02M 25/0798* (2013.01); *F02B 29/0443* (2013.01); *F02B 37/00* (2013.01); *Y02T 10/121* (2013.01)

(58) Field of Classification Search
CPC .. F02C 6/12; F02M 25/0709; F02M 25/0712; F02M 25/0731; F02M 25/0798; F02M 25/071; F02B 29/0443; F02B 37/00; Y02T 10/121
USPC ........ 60/602, 605.2, 611; 123/568.11, 568.12
See application file for complete search history.

(56) References Cited

U.S. PATENT DOCUMENTS

| | | | | |
|---|---|---|---|---|
| 4,250,711 | A | * | 2/1981 | Zehnder ....................... 60/605.2 |
| 6,050,095 | A | | 4/2000 | Blake |
| 6,145,313 | A | * | 11/2000 | Arnold .......................... 60/605.2 |
| 6,263,672 | B1 | | 7/2001 | Roby et al. |
| 6,360,541 | B2 | | 3/2002 | Waszkiewicz et al. |
| 6,381,960 | B1 | | 5/2002 | Mardberg |

(Continued)

FOREIGN PATENT DOCUMENTS

| | | |
|---|---|---|
| DE | 7529221 U | 11/1977 |
| DE | 19756060 C1 | 12/1998 |

(Continued)

OTHER PUBLICATIONS

Ming Zheng, Graham Reader, Gary Hawley; Diesel Engine Exhaust Gas Recirculation—A Review on Advanced and Novel Concepts; Apr. 2004; Energy Conversion and Management; vol. 45, Issue 6; pp. 883-900.*

(Continued)

*Primary Examiner* — Thomas Denion
*Assistant Examiner* — Thomas Olszewski
(74) *Attorney, Agent, or Firm* — Cantor Colburn LLP

(57) ABSTRACT

According to one embodiment of the invention, a compressor housing includes a compressor inlet in fluid communication with a compressor volute configured to house a compressor wheel, the compressor inlet configured to provide a first air flow to the compressor wheel and a compressor outlet in fluid communication with the compressor volute, the compressor outlet configured to direct a compressed gas to an intake manifold. The compressor housing further includes an exhaust gas recirculation inlet port in fluid communication with the compressor volute, the exhaust gas recirculation inlet port being configured to combine an exhaust gas flow with the air flow to the compressor wheel.

17 Claims, 5 Drawing Sheets

(56) References Cited

U.S. PATENT DOCUMENTS

| | | | |
|---|---|---|---|
| 6,430,929 B2 * | 8/2002 | Martin | 60/605.2 |
| 6,494,041 B1 | 12/2002 | Lebold | |
| 6,601,388 B1 | 8/2003 | Gladden | |
| 7,624,575 B2 * | 12/2009 | Noelle et al. | 60/605.1 |
| 7,721,542 B2 | 5/2010 | Chen | |
| 2003/0015596 A1 * | 1/2003 | Evans | 239/8 |
| 2005/0188693 A1 * | 9/2005 | Schmid et al. | 60/605.2 |
| 2007/0144170 A1 * | 6/2007 | Griffith | 60/605.2 |
| 2007/0256411 A1 * | 11/2007 | Marsal et al. | 60/297 |
| 2007/0283698 A1 | 12/2007 | Chen | |
| 2008/0134678 A1 * | 6/2008 | Noelle et al. | 60/605.2 |
| 2009/0132153 A1 * | 5/2009 | Shutty et al. | 60/605.2 |
| 2009/0151333 A1 * | 6/2009 | Vigild et al. | 60/286 |
| 2009/0158713 A1 * | 6/2009 | Oba | 60/286 |
| 2009/0277431 A1 | 11/2009 | Nitzke et al. | |
| 2010/0040467 A1 * | 2/2010 | Mudel | 415/214.1 |
| 2010/0050634 A1 * | 3/2010 | Yager | 60/605.2 |
| 2010/0122530 A1 * | 5/2010 | French | 60/605.2 |
| 2011/0048003 A1 | 3/2011 | Chen | |
| 2011/0067680 A1 | 3/2011 | Williams et al. | |
| 2011/0088393 A1 | 4/2011 | Romblom et al. | |
| 2012/0017879 A1 | 1/2012 | Wu | |
| 2012/0067330 A1 | 3/2012 | Wu | |
| 2012/0067332 A1 | 3/2012 | Wu | |
| 2012/0159949 A1 | 6/2012 | Wu | |
| 2012/0159950 A1 | 6/2012 | Wu | |

FOREIGN PATENT DOCUMENTS

| | | |
|---|---|---|
| DE | 10303776 A1 | 8/2004 |
| DE | 112006003468 T5 | 11/2008 |
| DE | 102008052088 A1 | 4/2010 |
| EP | 2261481 A1 | 12/2010 |
| JP | 2007154675 A | 6/2007 |
| JP | 2008309125 A | 12/2008 |
| WO | 2009068181 A1 | 6/2009 |

OTHER PUBLICATIONS

Aachener Kolloquium Fahrzeug—und Motorentechnik 2009; New Aspects of Application of Hybrid EGR Systems to Turbocharged GDI Engines; David Roth, Rong Zhang, Rolf Sauerstein, Michael Becker, BorgWarner Engine Systems Group, pp. 1-24.

John E. Dec, Wontae Hwang, Yi Yang, HCCI and Stratified-Charge CI Engine Combustion Research, U.S. Doe, Office of Vehicle Technologies Annual Merit Review and Peer Evaluation, Sandia National Laboratories, May 19, 2009, pp. 1-18.

SAE International; SAE Technical Paper Series; Mixed-Source EGR for Enabling High Efficient Clean Combustion Modes in a Light-Duty Diesel Engine, Kukwon Cho, Manbae Han, Robert M. Wagner and C. Scott Sluder; Oak Ridge National Laboratory; Reprinted From: In-Cylinder Diesel Particulate & NOx Control, 2008 (SP-2168); 2008-01-0645; 2008 World Congress Detroit, Michigan Apr. 14-17, 2008, 11 pgs.

SAE International SAE Technical Paper Series; "Comparison of Different EGR Solutions"; Oldrich Vitek, Jan Macek and Milos Polasek, Czech Tehcnical University in Prague, Josef Bozek Research Center, Stefan Schmerbeck, Volkswagen AG, Thomas Kammerdiener AVL Graz, AVL Fuel Systems; Reprinted from: Modeling of SI & Diesel Engines, 2008 (SP-2156); 2008-01-0206; 2008 World Congress Detroit, Michigan Apr. 14-17, 2008, 20 pgs.

Can Future Emissions Limits be Met with a Hybrid EGR System Alone. Robert Czarnowski, Volker Joergle, Olaf Weber, John Shutty, Phil Keller; BorgWarner, Inc., 2008 Diesel Engine-Efficiency and Emissions Research (DEER) conference; Aug. 4-7, 2008 Dearborn, Michigan, pp. 1-20.

German Office Action for Application No. 102011121276.4 dated Sep. 4, 2012; 6 pages.

German Office Action for Application No. 102011121465.1 dated Mar. 14, 2013; 11 pages.

German Office Action for Application No. 102011121276.4 dated Mar. 20, 2013; 7 pages.

* cited by examiner

BOOSTING DEVICES WITH INTEGRAL FEATURES FOR RECIRCULATING EXHAUST GAS

FEDERAL RESEARCH STATEMENT

This invention was made with Government support under Agreement No. DE-FC26-07NT43271, awarded by the Department of Energy. The U.S. Government has certain rights in the invention.

FIELD OF THE INVENTION

Exemplary embodiments of the present invention are related to turbochargers, superchargers and air induction systems, and, more particularly, to a housing having an integral exhaust gas recirculation (EGR) conduit.

BACKGROUND

The efficient use of exhaust gas recirculation (EGR) is important to all modern internal combustion engines, including both gasoline and diesel engines. Efficient use of EGR generally supports the objectives of realizing high power output from these engines while also achieving high fuel efficiency and economy and achieving increasingly stringent engine emission requirements. The use of forced-induction apparatus, particularly including turbochargers and superchargers, in these engines is frequently employed to increase the engine intake mass airflow and the power output of the engine. In addition, superchargers include mechanical drive components, such as belts, gears, shafts or chains that are connected to the engine's crankshaft, and may present engine packaging challenges. Turbochargers are powered by exhaust gas, so the efficient use of EGR and forced-induction necessitates synergistic design of these systems.

It is desirable to have turbocharged or supercharged engines efficiently use the energy available in the exhaust system in order to improve overall engine efficiency and fuel economy. Further, as engines become more complex, packaging of various components can make design of the turbocharger or supercharger challenging. For example, as emissions regulations become more stringent, a closely coupled catalytic converter may be mounted directly to the turbocharger exhaust outlet. This may impact the positioning of EGR system components, such as exhaust gas supply and receiving ports. Accordingly, improved packaging of the turbocharger, air induction system, exhaust system and EGR system will enable the expanded use of turbochargers and EGR systems in a variety of applications, thereby leading to improved efficiency and performance.

SUMMARY OF THE INVENTION

According to one embodiment of the invention, a compressor housing includes a compressor inlet in fluid communication with a compressor volute configured to house a compressor wheel, the compressor inlet configured to provide a first air flow to the compressor wheel and a compressor outlet in fluid communication with the compressor volute, the compressor outlet configured to direct a compressed gas to an intake manifold. The compressor housing further includes an exhaust gas recirculation inlet port in fluid communication with the compressor volute, the exhaust gas recirculation inlet port being configured to combine an exhaust gas flow with the air flow to the compressor wheel.

According to another embodiment, a forced air induction apparatus includes a compressor comprising a compressor wheel rotatably disposed in a compressor housing and a compressor inlet in the compressor housing, the compressor inlet in fluid communication with a compressor volute containing the compressor wheel. In addition, the apparatus includes a compressor outlet in the compressor housing, the compressor outlet in fluid communication with the compressor volute and an exhaust gas recirculation inlet port located on the compressor housing, the exhaust gas recirculation inlet port in fluid communication with the compressor volute.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

Figure 1:
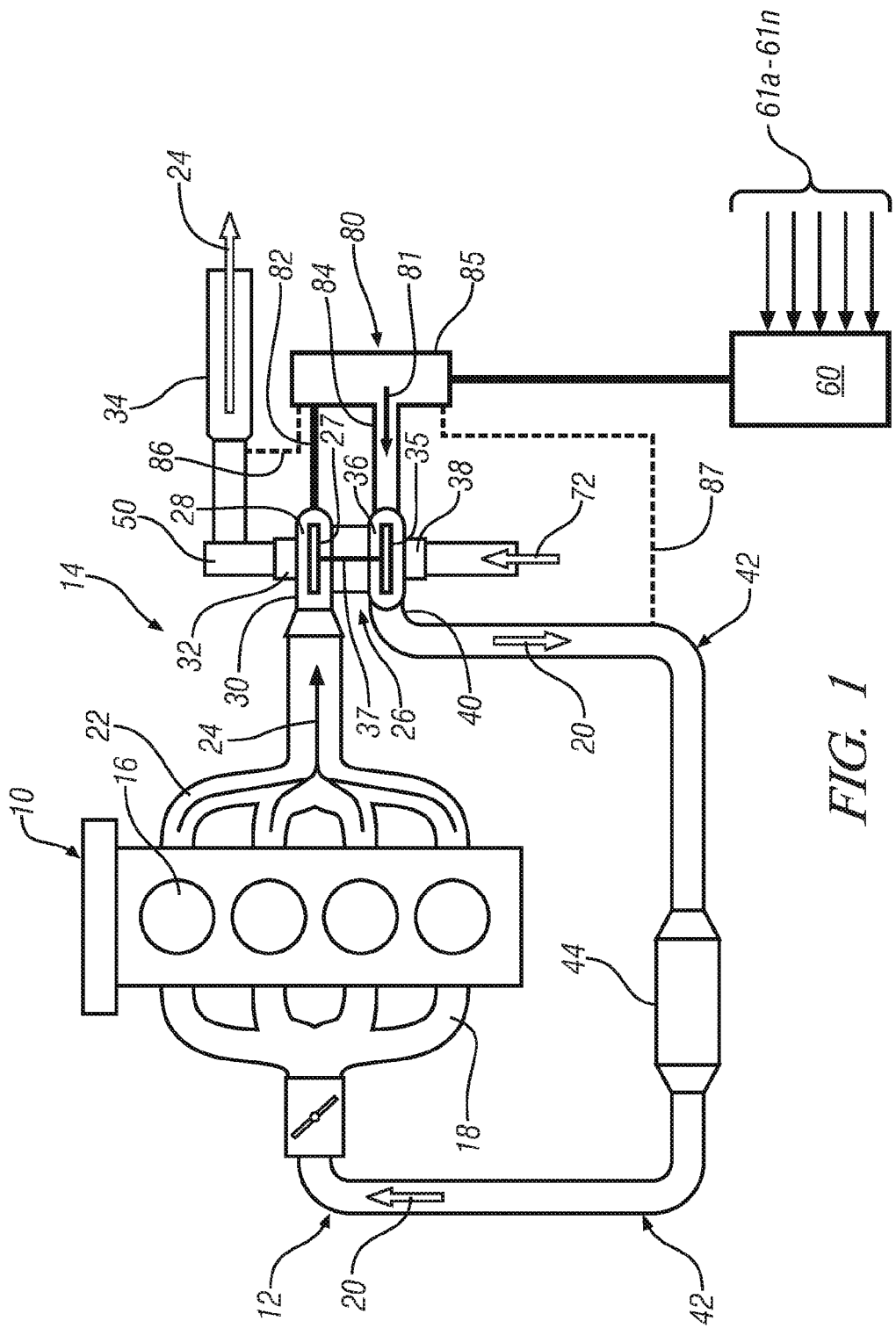
FIG. 1 is a schematic diagram of an internal combustion engine embodying features of the invention.

The detailed description explains embodiments of the invention, together with advantages and features, by way of example with reference to the drawings.

DETAILED DESCRIPTION OF THE EMBODIMENTS

The following description is merely exemplary in nature and is not intended to limit the present disclosure, application or uses. It should be understood that throughout the drawings, corresponding reference numerals indicate like or corresponding parts and features.

Referring to FIG. 1, an exemplary embodiment of an internal combustion engine 10 is illustrated, in this case an in-line four cylinder engine, including an intake system 12 and an exhaust system 14. The internal combustion engine includes a plurality of cylinders 16 into which a combination of combustion air and fuel are introduced. The combustion air/fuel mixture is combusted resulting in reciprocation of pistons (not shown) therein. The reciprocation of the pistons rotates a crankshaft (not shown) to deliver motive power to a vehicle powertrain (not shown) or to a generator or other stationary recipient of such power (not shown) in the case of a stationary application of the internal combustion engine 10.

The internal combustion engine 10 includes an intake manifold 18, in fluid communication with the cylinders 16, that receives a compressed intake charge from a compressor in the intake system 12 and delivers the charge to the plurality of cylinders 16. The exhaust system 14 includes an exhaust manifold 22, also in fluid communication with the cylinders 16, which is configured to remove combusted constituents of the combustion air and fuel (i.e. exhaust gas 24) and to deliver it to an exhaust driven turbocharger 26 that is located in fluid communication therewith. The exhaust driven turbocharger 26 includes an exhaust gas turbine wheel 27 that is housed within a turbine housing 28. The turbine housing includes an inlet 30 and an outlet 32. The outlet 32 is in fluid communication with the remainder of the exhaust system 14 and delivers the exhaust gas 24 to an exhaust gas conduit 34. The exhaust gas conduit 34 may include various exhaust after treatment devices, such as catalytic converter 50. As depicted, the catalytic converter 50 is close coupled to the outlet 32 of the turbocharger 26 and is configured to treat various regulated constituents of the exhaust gas 24 prior to its release to the atmosphere.

The exhaust driven turbocharger 26 also includes an intake charge compressor wheel 35 that is housed within a compressor housing 36. The compressor wheel 35 is coupled by a shaft 37 to turbine wheel 27. The compressor housing 36 includes an inlet 38 and an outlet 40. The outlet 40 is in fluid communication with the intake system 12 and delivers a compressed intake charge 20 through an intake charge conduit 42 to the intake manifold 18. The intake charge 20 is distributed by the intake manifold 18 to the cylinders 16 of the internal combustion engine 10 for mixing with fuel and for combustion therein. In an exemplary embodiment, disposed inline between the compressor housing outlet 40 and the intake manifold 18 is a compressed intake charge cooler 44. The compressed intake charge cooler 44 receives heated (due to compression) compressed intake charge 20 from the intake charge conduit 42 and, following cooling of the compressed intake charge 20 therein, delivers it to the intake manifold 18 through a subsequent portion of the intake charge conduit 42.

Located in fluid communication with the exhaust system 14, and in the exemplary embodiment shown in FIG. 1, is an exhaust gas recirculation ("EGR") system 80. The EGR system 80 includes EGR supply conduit 82, EGR inlet conduit 84, and EGR valve 85. In one embodiment, the EGR supply conduit 82 is in fluid communication with and coupled to turbine housing 28. In addition, the EGR inlet conduit 84 is in fluid communication with and coupled to compressor housing 36. The EGR supply conduit 82 is configured to divert a portion of the exhaust gas 24 from the turbine housing 28 and to direct it to, or recirculate it to, the intake system 12 through the compressor housing 36 of the exhaust driven turbocharger 26. As depicted, the EGR valve 85 is in signal communication with a control module such as engine controller 60. The EGR valve 85 adjusts the volumetric quantity of received exhaust gas 24 that is diverted, as recirculated exhaust gas 81, to the intake system 12, based on the particular engine operating conditions at any given time. The engine controller 60 collects information regarding the operation of the internal combustion engine 10 from sensors 61a-61n, such as temperature (intake system, exhaust system, engine coolant, ambient, etc.), pressure, exhaust system conditions, driver demand and, as a result, may adjust the flow of exhaust gas 24 through the EGR valve 85 to be mixed with fresh air 72 to form the compressed intake charge 20. As used herein, the term controller refers to an application specific integrated circuit (ASIC), an electronic circuit, a processor (shared, dedicated or group) and memory that executes one or more software of firmware programs, a combinational logic circuit, and/or other suitable components that provide the described functionality. As a result, the compressed intake charge 20 may comprise a continuously variable combination of fresh air 72 and exhaust gas 24, depending on the commanded quantity of EGR by the controller 60. In another embodiment, an exhaust gas supply 86 may be diverted from exhaust conduit 34, either upstream or downstream of catalytic converter 50 to the EGR valve 85. In yet another embodiment, an EGR inlet 87 is in fluid communication with intake charge conduit 42, thereby directing the exhaust gas to be mixed with the air intake charge 20 downstream of the turbocharger 26.

In an exemplary embodiment, the EGR supply conduit 82 is coupled to the turbine housing 28 via a supply port near the exhaust outlet 32. The exhaust flow 24 passes through the turbine wheel 27 located in the turbine housing 28. The EGR supply conduit 82 receives a portion of exhaust flow 24 from the chamber directed through exhaust outlet portion 32, prior to treatment of the exhaust flow 24 by catalytic converter 50. Exemplary embodiments of the turbocharger 26 and EGR system 80, as well as various arrangements thereof are described in detail below with reference to FIGS. 2-4.

Figure 2:
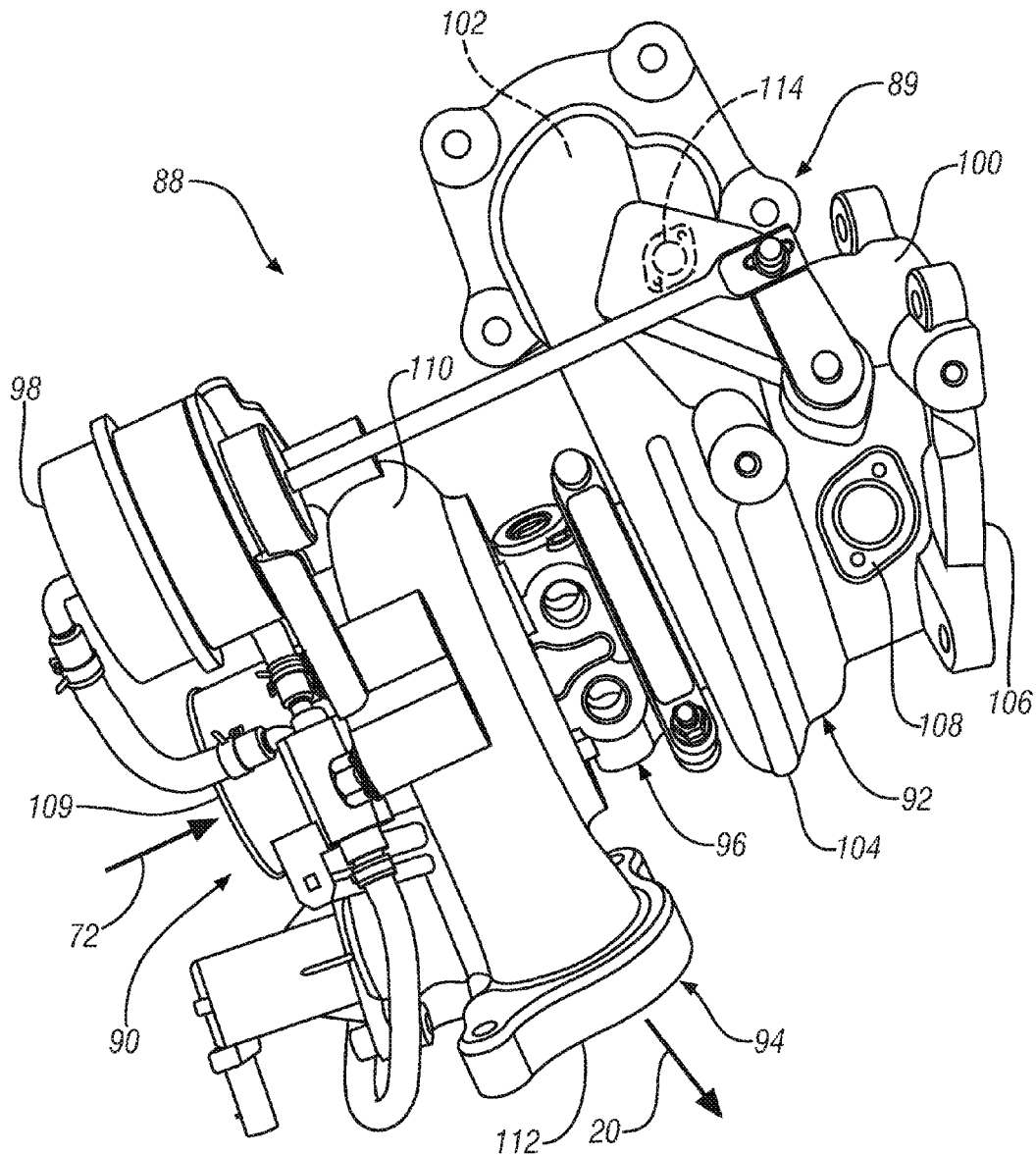
FIG. 2. is a perspective view of an embodiment of a turbocharger.

Referring now to FIGS. 1 and 2, in one embodiment, an exemplary turbocharger 88 includes turbine portion 89 and compressor portion 90. The turbine portion 89 includes a turbine housing 92 and compressor portion 90 includes compressor housing 94. The turbine housing 92 and compressor housing 94 are coupled by shaft housing 96. The turbocharger 88 also includes a wastegate controller 98 configured to control a selected flow of exhaust through a wastegate passage 100. The turbine housing 92 includes an exhaust inlet 102 configured to receive exhaust flow 24, FIG. 1, from the exhaust manifold 22. The exhaust gas flow 24 drives rotation of the turbine wheel 27, located in turbine volute 104 of turbine housing 92. The turbine housing 92 also includes an exhaust outlet 106 which directs exhaust gas flow 24 from the turbine volute 104 to exhaust system 34. An EGR supply port 108 is located on, and in fluid communication with, exhaust outlet 106. The EGR supply port 108 is configured to direct a portion of exhaust gas 24 from the turbine volute 104 to EGR supply conduit 82. The EGR supply conduit 82 directs the exhaust gas 24 to EGR valve 85, wherein a selected amount of the exhaust gas flow 24 is directed to air intake manifold 18 via suitable conduits or plumbing, such as EGR inlet conduit 84 and compressor volute 110, which direct the exhaust gas flow 24 to intake charge conduit 42.

The turbine wheel 27 within turbine housing 28, 92 is coupled by shaft 37 (FIG. 1) within shaft housing 96 to compressor wheel 35 in compressor housing 94. The shaft housing 96 also includes bearings (not shown) to enable rotation of the shaft 37. The compressor housing 94 includes air inlet 109, compressor volute 110, and compressed air outlet 112. The air inlet 109 receives fresh air 72 and directs the air to the compressor wheel 35 within compressor volute 110. The compressed air is directed from the compressor volute 110 to the compressed air outlet 112, where the air intake charge 20 is then routed to the engine 10 by intake system 12. In an exemplary embodiment, an EGR supply port 114 is in fluid communication with and located on wastegate passage 100 where a portion of the exhaust gas flow 24 that is directed through the passage 100 may be directed through EGR system 80 to be mixed with fresh air at intake 38. The exhaust gas flow through EGR supply port 114 is located upstream of the turbine wheel and is therefore at a higher pressure relative to exhaust gas flow downstream of the turbine wheel 27. In an exemplary embodiment, the EGR supply port 114 may be used instead of, or in combination with, EGR supply port 108. The turbine housing 92 and EGR supply ports 108 and 114 may be produced by any suitable method, such as machining the parts, casting as a single part or by casting a plurality of parts and coupling them via welds or fasteners. The parts may be formed from any suitable, durable material, such as cast iron, stainless steel or a steel alloy. As discussed herein, the non-limiting examples of the turbocharger depicted in FIGS. 2-4 may include substantially similar components, although each component may not be shown in each figure, wherein the illustrated embodiments are used to describe particular portions of the turbocharger, and/or EGR system configurations.

The EGR supply conduit 82 and EGR supply ports 108 and 114 provide improved packaging for increasingly complex engines by providing EGR integration with the turbocharger 88. In addition, the configuration provides flexibility for a variety of engines and applications. By integrating the EGR supply ports 108 and 114 with the turbine housing 92, the embodiments provide a simplified system to reduce cost and reduce production time. Moreover, the embodiments provide improved engine efficiency by enabling a supply of exhaust gas 24 from the turbocharger 88 upstream of closely coupled catalytic converter 50. As discussed herein, the term volute is used to refer to a housing which may be a part of a turbocharger or supercharger. In an exemplary embodiment, a volute is a housing configured to house a wheel, such as compressor wheel 35.

Figure 3:
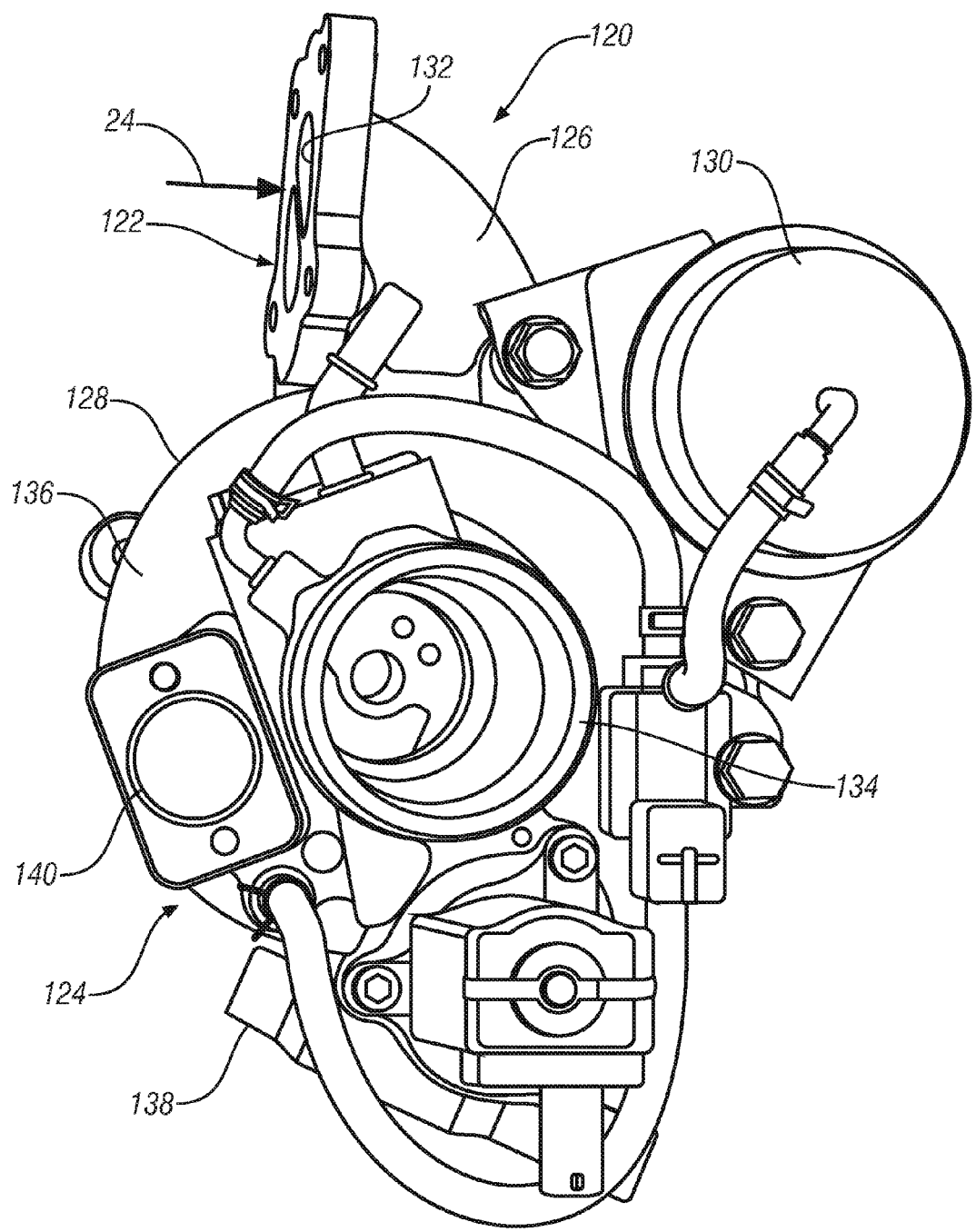
FIG. 3 is a perspective view of another embodiment of a turbocharger.

Referring now to FIGS. 1 and 3, in an exemplary embodiment, a turbocharger 120 includes turbine portion 122 and compressor portion 124. The turbine portion 122 includes a turbine housing 126 and the compressor portion 124 includes a compressor housing 128. The turbine housing 126 and compressor portion 124 are coupled by a shaft housing (not shown). The turbocharger 120 further includes a wastegate controller 130 configured to enable a flow of exhaust through a wastegate passage (not shown). The turbine housing 126 includes an exhaust inlet 132 configured to receive exhaust flow 24 from the exhaust manifold 22. The exhaust gas flow 24 through turbine volute within turbine housing 126 drives rotation of the turbine wheel 27. The turbine housing 126 also includes an exhaust outlet (not shown) which directs exhaust gas flow 24 from the turbine volute to exhaust system 34 and catalytic converter 50.

The compressor housing 128 includes air inlet 134, compressor volute 136, compressor outlet 138, and EGR inlet port 140. The air inlet 134 receives fresh air 72 and directs the flow to the compressor wheel 35 within compressor volute 136. As depicted, the EGR inlet port 140 is in fluid communication with the air inlet 134, thereby enabling a combination of exhaust gas 24 with fresh air 72. In an exemplary embodiment, the EGR inlet port 140 receives exhaust gas 24 from EGR inlet conduit 84 and EGR valve 85, wherein the EGR valve 85 receives the exhaust gas from EGR supply conduit 82 coupled to EGR supply port 108, shown in FIG. 2. In another embodiment, the EGR inlet port 140 receives exhaust gas 24 from EGR conduit 86, which is coupled to exhaust conduit 34, and directs the exhaust gas 24 through the EGR valve 85 through EGR inlet conduit 84 to EGR inlet port 140. In the embodiment of FIG. 3, the arrangement of EGR inlet port 140 in fluid communication with and located on air inlet 134 forms a combined flow of EGR exhaust gas and fresh air 72 to the compressor wheel. In an exemplary embodiment, the EGR inlet port 140 is positioned upstream of the compressor wheel, which supplies the EGR flow at a lower pressure relative to the gas flow upstream of the compressor wheel. Accordingly, the compressor wheel 35 compresses and pressurizes the fresh air and EGR exhaust gas mixture, and directs the intake charge 20 mixture through the compressor outlet 138. The compressed air and EGR gas mixture is then directed to the engine 10 by intake system 12. As discussed herein, the terms upstream and downstream describe the position of components or parts of the turbocharger or EGR system in relation to the flow of gas, air, exhaust, or a combination thereof, through the system. Further, in an exemplary embodiment, the pressure of the fluid flow upstream of a turbine wheel is greater than a fluid flow pressure downstream of the turbine wheel. Moreover, the pressure of the fluid flow upstream of a compressor wheel is less than the fluid flow pressure downstream of the compressor wheel. The integration of EGR inlet port 140 with compressor housing 128 provides manufacturing and design flexibility via simplified packaging for a variety of internal combustion engines.

Figure 4:
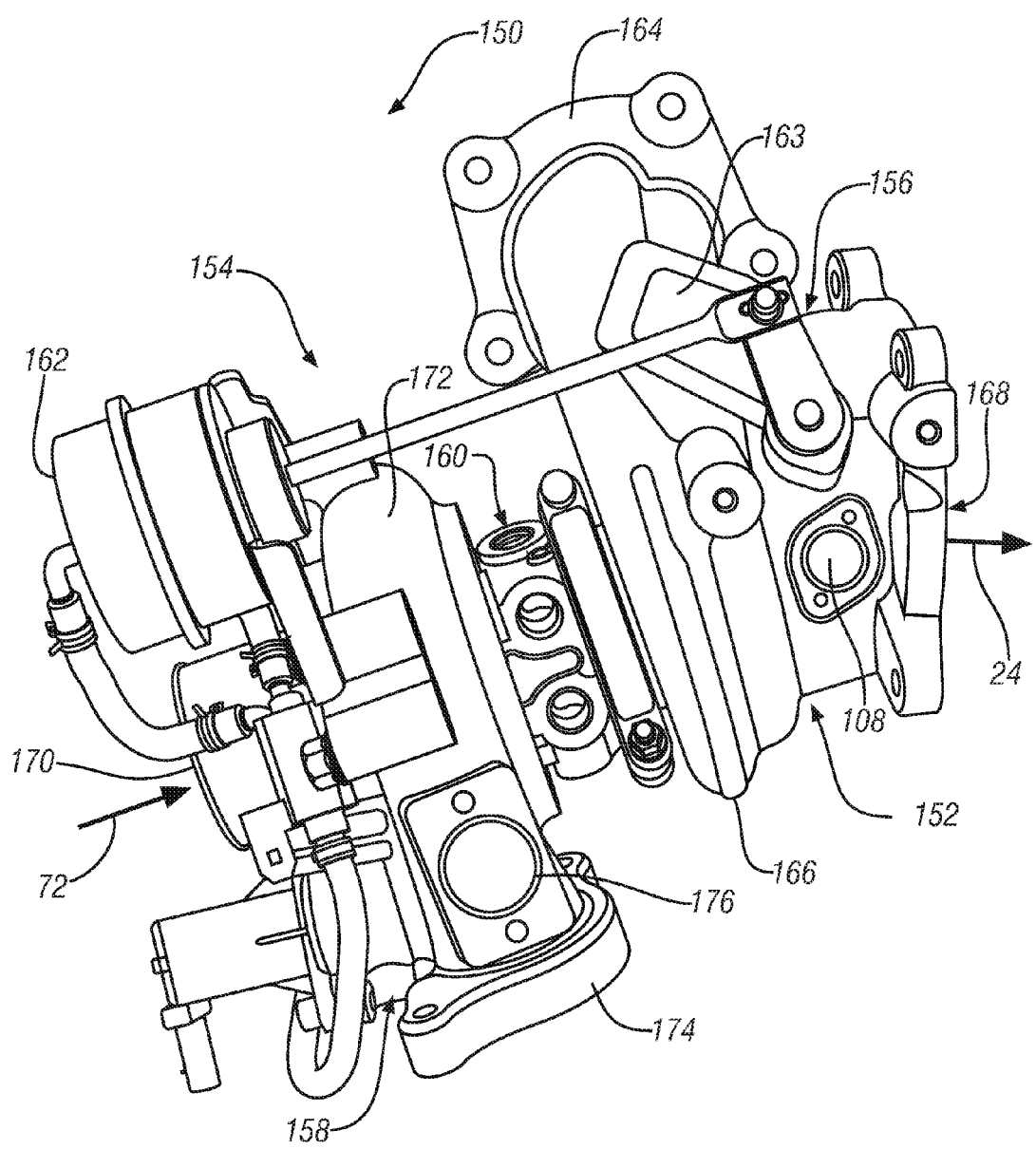
FIG. 4 is a perspective view of yet another embodiment of a turbocharger.

Referring now to FIGS. 1 and 4, in one embodiment, an exemplary turbocharger 150 includes turbine portion 152 and compressor portion 154. The turbine portion 152 includes a turbine housing 156 while compressor portion 154 includes a compressor housing 158. Shaft housing 160 couples turbine housing 156 and compressor housing 158. The turbocharger 150 includes a wastegate controller 162 configured to control a flow of exhaust through a wastegate passage 163. The turbine housing 156 includes an exhaust inlet 164 configured to receive exhaust flow 24 from the exhaust manifold 22. The exhaust gas flow 24 drives rotation of the turbine wheel 27, located in a turbine volute 166 of housing 156. The turbine housing 156 also includes an exhaust outlet 168 which directs exhaust gas flow 24 from the turbine volute 166 to catalytic converter 50, exhaust conduit 34 or other exhaust treatment devices.

The turbine wheel 27 within turbine housing 156 is coupled by a shaft (not shown) to a compressor wheel 35 in compressor housing 158. The compressor housing 158 includes air inlet 170, compressor volute 172, compressor outlet 174, and EGR inlet port 176. As depicted, the air inlet 170 receives fresh air 72 and directs an air flow to the compressor wheel 35 within compressor volute 172. Compressed fresh air 72 is directed from the compressor volute 172 to compressor outlet 174. The EGR inlet port 176 is in fluid communication with the compressor outlet 174. In an exemplary embodiment, the EGR inlet port 176 receives the exhaust gas 24 from EGR inlet conduit 84 of the EGR system 80, wherein the inlet conduit 84 receives the exhaust gas from EGR supply conduit 82 coupled to EGR supply port 108, shown in FIGS. 2 and 4. In another embodiment, the EGR inlet port 176 receives the exhaust gas 24 from EGR conduit 86, which is coupled to exhaust conduit 34, and directs the exhaust gas 24 through the EGR valve 85 through EGR inlet conduit 84 to EGR inlet port 176. As depicted in FIG. 4, a combined flow of exhaust gas 24 from EGR inlet port 176 and fresh air 72 from compressor volute 172 are directed to the engine intake manifold 18. In addition, the EGR inlet port 176 is positioned downstream of the compressor wheel 35 and supplies the EGR flow at a pressure that is greater than the pressure of air flow upstream of the compressor wheel. Accordingly, the compressor wheel 35 compresses and pressurizes the fresh air which is then directed to compressor outlet 174 where the compressed air is mixed with exhaust gas 24 to form the intake charge 20 which is directed from the compressor outlet 174 to the engine 10 via intake system 12. The integration of EGR inlet port 176 with compressor housing 158 provides manufacturing and design flexibility via simplified packaging for a variety of internal combustion engines.

With reference to FIGS. 3 and 4, in exemplary embodiments, the EGR inlet conduit 84 (FIG. 1) is in fluid communication with an EGR inlet port (140, 176) coupled to or located on the compressor housing 36. A selected amount of recirculated exhaust flow 81 is routed from an exhaust supply, such as turbine housing 28 or exhaust conduit 34, through EGR valve 85 to inlet conduit 84. The recirculated exhaust flow 81 is introduced into the compressor housing 36, thereby reducing the complexity of the EGR plumbing and conduits (82, 84, 85). Therefore, the EGR inlet port (140, 176) and inlet conduit 84 provide improved and simplified packaging for increasingly complex engines by providing EGR integration with turbocharger (120, 150). In addition, the configuration provides flexibility for a variety of engine configurations and applications. By integrating the EGR inlet port (140, 176) with the compressor housing (128, 158), the embodiments provide a simplified system to reduce cost and reduce production time. Moreover, the embodiments provide improved engine efficiency by enabling a supply of exhaust gas 24 from the turbocharger (120, 150) upstream of closely coupled catalytic converter 50.

The exemplary embodiments of EGR supply ports and EGR inlet ports may be used in combination or with alternative arrangements for air intake systems, turbochargers, superchargers or exhaust systems. For example, the EGR supply port 108 may supply a recirculated exhaust gas flow that is directed to EGR exhaust inlet port 140 and/or EGR exhaust inlet port 176. In an embodiment that includes EGR supply port 108 and EGR exhaust inlet port 140, the relative low pressure exhaust from port 108 is directed to a relative low pressure air flow at inlet port 140. In another embodiment that includes EGR supply port 108 and EGR exhaust inlet port 176, the exhaust from port 108 is directed to a relative high pressure compressed air flow at inlet port 176. In yet another embodiment that includes EGR supply port 114 (FIG. 2) and EGR exhaust inlet port 176, the relative high pressure exhaust from port 114 is directed to a relative high pressure compressed air flow at inlet port 176. In an embodiment that includes EGR supply port 114 and EGR exhaust inlet port 140, the relative high pressure exhaust from port 114 is directed to a relative low pressure air flow at inlet port 140. In embodiments, the turbine portion 152 and compressor portion 154 may be separated, wherein the compressor portion 154 is driven by an electric motor. Accordingly, the turbine portion 152 and compressor portion 154 are operationally coupled by such non-limiting examples as electrical conductors and/or a mechanical device, such as a shaft.

Figure 5:
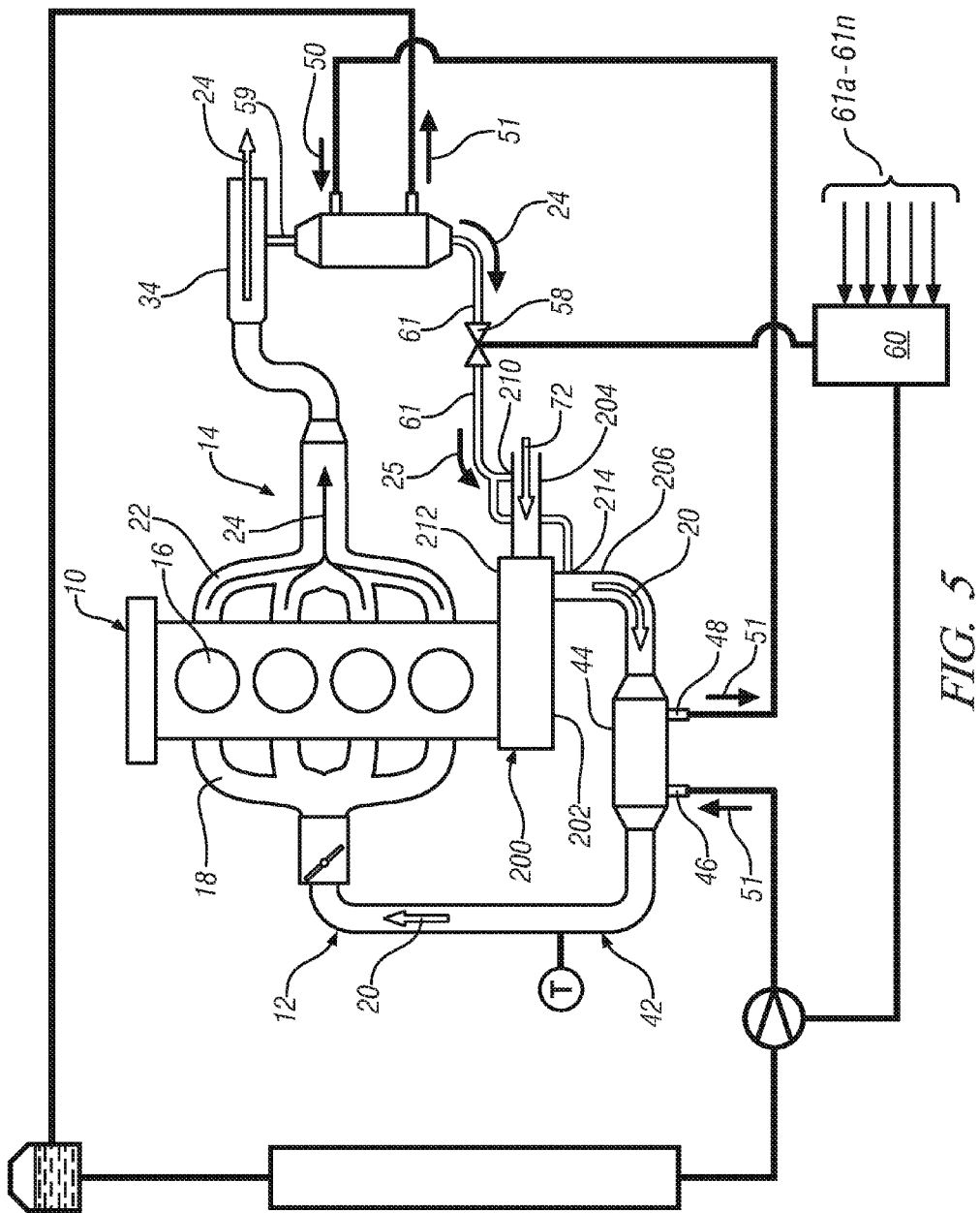
FIG. 5 is a schematic diagram of another embodiment of an internal combustion engine embodying features of the invention.

The exemplary compressors 124 and 154 illustrated in FIGS. 3 and 4, respectively may also be used in various forced air induction apparatus, such as the exemplary supercharger and engine depicted in FIG. 5. As depicted in FIG. 5, an exemplary embodiment of the internal combustion engine 10 includes an intake manifold 18, in fluid communication with cylinders 16 that receive a compressed intake charge from a compressor in the intake system 12. The exhaust system 14 includes an exhaust manifold 22, also in fluid communication with cylinders 16, which is configured to remove combusted constituents of the combustion air and fuel (i.e. exhaust gas 24) and to deliver it to an exhaust gas conduit 34. The exhaust gas conduit is in fluid communication with the remainder of the exhaust system 14 and delivers the exhaust gas 24 to various exhaust after treatment devices, such as a catalytic converter.

The intake system 12 also includes an intake charge compressor or engine driven supercharger 200 having a housing 202 that includes an inlet 204 and an outlet 206. The outlet 206 is in fluid communication with the intake system 12 and delivers a compressed intake charge 20 through an intake charge conduit 42 to the intake manifold 18 for delivery to the cylinders 16 of the internal combustion engine 10 for mixture with fuel and for combustion therein. In an exemplary embodiment, disposed inline between the compressor housing outlet 206 and the intake manifold 18 is a compressed intake charge cooler 44. The compressed intake charge cooler 44 receives the heated (due to compression of the intake charge and addition of hot EGR) compressed intake charge 20 from the intake charge conduit 42 and, following cooling of the compressed intake charge 20 therein, delivers it to the intake manifold 18 through a subsequent portion of the intake charge conduit 42. The intake charge cooler 44 comprises an inlet 46 and an outlet 48 for the circulation of a cooling medium 51 (such as a typical glycol-based automotive coolant, or other suitable medium for effective heat transfer in a heat exchanger) therethrough.

Located in fluid communication with the exhaust gas conduit 34 of the exhaust system 14, is an exhaust gas recirculation ("EGR") conduit 59. The EGR conduit 59 is configured to divert a portion of the exhaust gas 24 from the exhaust gas conduit 34 and to return it to, or recirculate it to, the intake system 12 of the internal combustion engine 10 through EGR conduit 61, EGR valve 58, EGR inlet port 210 and inlet 204 of the engine driven supercharger 200. The EGR inlet port 210 is located on inlet 204 and combines a flow of recirculated exhaust gas 25 with the fresh air flow 72 upstream of a supercharger compressor wheel 212. Therefore, the flow of exhaust and air at EGR inlet port 210 is at a lower pressure relative to the flow pressure downstream (20) of the compressor wheel 212. In addition, a second EGR inlet port 214 may be located on or near the compressor housing outlet 206, wherein the recirculated exhaust gas 24 is combined with a compressed air flow, forming intake charge 20. Therefore, the flow of exhaust and air at inlet port 214 is at a pressure greater than the air flow (72) upstream of the compressor wheel 212. In embodiments, either one, or a combination of, the EGR inlet ports 210 and 214 may be used along with associated EGR conduits to supply a recirculated exhaust flow to be mixed with air.

The EGR valve 58 that is in signal communication with a control module, such as controller 60, adjusts the volumetric quantity of recirculated exhaust gas 25 that is delivered to the intake system 12, based on the particular engine operating conditions at any given time. The engine controller 60 collects information regarding the operation of the internal combustion engine 10 from sensors 61a-61n, such as temperature (intake system, exhaust system, engine coolant, ambient, etc.), pressure, exhaust system conditions, driver demand as well as the temperature of the compressed intake charge supplied by a temperature sensor (not shown) and, as a result, may adjust the flow of recirculated exhaust gas 25 through the EGR valve 58 and into the compressed intake charge 20. As a result the compressed intake charge 20 may comprise a continuously variable combination of fresh air 72 and recirculated exhaust gas 25, depending on the commanded degree of EGR flow by the controller 60. Accordingly, the depicted configuration of the EGR system, intake system, and supercharger provides improved packaging and simplified design, thereby reducing costs and enabling improved engine efficiency.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A compressor housing comprising:
   a compressor inlet in fluid communication with a compressor volute configured to house a compressor wheel, the compressor inlet configured to provide an air flow to the compressor volute;
   a compressor outlet in fluid communication with the compressor volute, the compressor outlet being configured to direct a compressed gas to an intake manifold;
   a compressor exhaust gas recirculation inlet port formed in the compressor housing and in fluid communication with the compressor inlet, the compressor exhaust gas recirculation inlet port configured to combine an exhaust gas flow with the air flow upstream of the compressor wheel, wherein the compressor exhaust gas recirculation inlet port is separate from the compressor inlet;
   a turbine that includes a turbine wheel rotatably disposed in a turbine housing operationally coupled to the compressor housing;
   a downstream exhaust gas recirculation supply port formed in the turbine housing and in fluid communication with the exhaust outlet of the turbine housing downstream of the turbine wheel, the downstream exhaust gas recirculation supply port configured to direct an exhaust gas flow through an exhaust gas recirculation conduit to the compressor exhaust gas recirculation inlet port; and
   an upstream exhaust gas recirculation supply port formed in the turbine housing and in fluid communication with the exhaust inlet of the turbine housing upstream of the turbine wheel, the upstream exhaust gas recirculation supply port configured to direct an exhaust gas flow through the exhaust gas recirculation conduit to the compressor exhaust gas recirculation inlet port.

2. The compressor housing of claim 1, wherein the compressor exhaust gas recirculation inlet port provides the exhaust gas flow at a pressure that is less than a fluid pressure downstream of the compressor wheel.

3. The compressor housing of claim 1, wherein at least a portion of the exhaust gas recirculation conduit is coupled between the downstream exhaust gas recirculation supply port and the compressor exhaust gas recirculation inlet port to supply the exhaust gas flow from the downstream exhaust gas recirculation supply port to the compressor exhaust gas recirculation inlet port.

4. The compressor housing of claim 3, further comprising:
   a downstream compressor exhaust gas recirculation inlet port formed in the compressor housing and in fluid communication with the compressor outlet, the compressor exhaust gas recirculation inlet port configured to combine an exhaust gas flow with the air flow downstream of the compressor wheel, wherein the compressor exhaust gas recirculation inlet port is separate from the compressor inlet.

5. The compressor housing of claim 4, further comprising a second exhaust gas recirculation conduit coupled between the upstream exhaust gas recirculation supply port and the downstream compressor exhaust gas recirculation inlet port to supply the exhaust gas flow from the upstream exhaust gas recirculation supply port to the downstream compressor exhaust gas recirculation inlet port.

6. A turbocharger comprising:
   a compressor housing with a compressor inlet configured to direct an air flow to a compressor wheel rotatably disposed within a compressor volute;
   a compressor outlet in the compressor housing, the compressor outlet configured to receive a compressed gas flow from the compressor volute;
   a compressor exhaust gas recirculation inlet port formed in the compressor housing at a point downstream of the compressor wheel and in fluid communication with the compressor outlet, the compressor exhaust gas recirculation inlet port configured to combine an exhaust gas flow with the air flow downstream of the compressor wheel, wherein the compressor exhaust gas recirculation inlet port is separate from the compressor inlet;
   a turbine that includes a turbine wheel rotatably disposed in a turbine housing operationally coupled to the compressor housing;
   an upstream exhaust gas recirculation supply port formed in the turbine housing, the upstream exhaust gas recirculation supply port configured to direct the exhaust gas flow through an exhaust gas recirculation conduit to the compressor exhaust gas recirculation inlet port, wherein the exhaust gas recirculation supply port is formed in the turbine housing such that the supply port is in fluid communication with and separate from either an exhaust inlet of the turbine housing or an exhaust outlet of the turbine housing; and
   a downstream exhaust gas recirculation supply port formed in the turbine housing and in fluid communication with the exhaust outlet of the turbine housing downstream of the turbine wheel, the downstream exhaust gas recirculation supply port configured to direct an exhaust gas flow through the exhaust gas recirculation conduit to the compressor exhaust gas recirculation inlet port.

7. The turbocharger of claim 6, further comprising a second compressor exhaust gas recirculation inlet port formed in the compressor housing and in fluid communication with the compressor inlet upstream of the compressor wheel.

8. The turbocharger of claim 7, further comprising a second compressor exhaust gas recirculation inlet port provides the exhaust gas flow at a pressure that is less than a fluid pressure downstream of the compressor wheel.

9. The turbocharger of claim 6, wherein the exhaust gas recirculation conduits comprise conduit comprises an exhaust gas recirculation valve, an exhaust gas recirculation supply conduit, and a compressor exhaust gas recirculation inlet conduit.

10. The turbocharger of claim 6, further comprising a catalytic converter coupled to the exhaust outlet of the turbine housing.

11. A forced air induction apparatus comprising:
    a compressor comprising a compressor wheel rotatably disposed in a compressor housing;
    a compressor inlet in the compressor housing, the compressor inlet in fluid communication with a compressor volute containing the compressor wheel;
    a compressor outlet in the compressor housing, the compressor outlet in fluid communication with the compressor volute;
    a turbine that includes a turbine wheel rotatably disposed in a turbine housing between an exhaust inlet and an exhaust outlet;
    an upstream exhaust gas recirculation supply port formed in the turbine housing and in fluid communication with the exhaust inlet of the turbine housing upstream of the turbine wheel, the upstream exhaust gas recirculation supply port configured to direct an exhaust gas flow through an exhaust gas recirculation conduit to a compressor exhaust gas recirculation inlet port formed in the compressor housing; and
    a downstream exhaust gas recirculation supply port formed in the turbine housing and in fluid communication with the exhaust outlet of the turbine housing downstream of the turbine wheel, the downstream exhaust gas recirculation supply port configured to direct an exhaust gas flow through the exhaust gas recirculation conduit to the compressor exhaust pas recirculation inlet port formed in the compressor housing.

12. The apparatus of claim 11, wherein the compressor exhaust gas recirculation inlet port is in fluid communication with the compressor inlet, and the compressor exhaust gas recirculation inlet port is configured to combine the exhaust gas flow with an air flow upstream of the compressor wheel.

13. The apparatus of claim 12, wherein the compressor exhaust gas recirculation inlet port provides the exhaust gas flow at a pressure that is less than a fluid pressure downstream of the compressor wheel.

14. The apparatus of claim 11, wherein the compressor exhaust gas recirculation inlet port is in fluid communication with the compressor outlet, and the compressor exhaust gas recirculation inlet port is configured to combine the exhaust gas flow with an air flow downstream of the compressor wheel.

15. The apparatus of claim 14, wherein the compressor exhaust gas recirculation inlet port provides the exhaust gas flow at a pressure that is greater than a fluid pressure upstream of the compressor wheel.

16. The apparatus of claim 11, wherein the upstream exhaust gas recirculation supply port is separate from the turbine exhaust inlet, and the downstream exhaust gas recirculation supply port is separate from the turbine exhaust outlet.

17. A forced air induction apparatus comprising:
a compressor comprising a compressor wheel rotatably disposed in a compressor housing;
a compressor inlet in the compressor housing, the compressor inlet in fluid communication with a compressor volute containing the compressor wheel;
a compressor outlet in the compressor housing, the compressor outlet in fluid communication with the compressor volute;
a turbine that includes a turbine wheel rotatably disposed in a turbine housing between an exhaust inlet and an exhaust outlet, the turbine further including:
an upstream exhaust gas recirculation supply port formed in the turbine housing and in fluid communication with the exhaust inlet of the turbine housing upstream of the turbine wheel, the upstream exhaust gas recirculation supply port configured to direct an exhaust gas flow through an exhaust gas recirculation conduit to the compressor; and
a downstream exhaust gas recirculation supply port formed in the turbine housing and in fluid communication with the exhaust outlet of the turbine housing downstream of the turbine wheel, the downstream exhaust gas recirculation supply port configured to direct an exhaust gas flow through an exhaust gas recirculation conduit to the compressor.

* * * * *